(12) United States Patent
Levan et al.

(10) Patent No.: US 7,591,880 B2
(45) Date of Patent: *Sep. 22, 2009

(54) FUEL CELL ANODE EXHAUST FUEL RECOVERY BY ADSORPTION

(75) Inventors: M. Douglas Levan, Brentwood, TN (US); John E. Finn, Mountain View, CA (US); James F. McElroy, Suffield, CT (US)

(73) Assignee: Bloom Energy Corporation, Sunnyvale, CA (US)

( * ) Notice: Subject to any disclaimer, the term of this patent is extended or adjusted under 35 U.S.C. 154(b) by 613 days.

This patent is subject to a terminal disclaimer.

(21) Appl. No.: 11/188,120

(22) Filed: Jul. 25, 2005

(65) Prior Publication Data

US 2007/0017369 A1    Jan. 25, 2007

(51) Int. Cl.
    *B01D 59/26* (2006.01)
(52) U.S. Cl. .................. 95/97; 95/96; 95/104; 95/143; 95/148; 96/108; 96/130
(58) Field of Classification Search ............ 95/96, 95/97, 104, 143, 148; 96/130, 108–154
    See application file for complete search history.

(56) References Cited

U.S. PATENT DOCUMENTS

| | | | |
|---|---|---|---|
| 3,488,266 A | 1/1970 | French | |
| 4,041,210 A | 8/1977 | Van Dine | |
| 4,182,795 A | 1/1980 | Baker et al. | |
| 4,532,192 A | 7/1985 | Baker et al. | |
| 4,792,502 A | 12/1988 | Trocciola et al. | |
| 4,898,792 A | 2/1990 | Singh et al. | |
| 4,917,971 A | 4/1990 | Farooque | |
| 4,983,471 A | 1/1991 | Reichner et al. | |
| 5,034,287 A | 7/1991 | Kunz | |
| 5,047,299 A | 9/1991 | Shockling | |
| 5,084,362 A | 1/1992 | Farooque | |
| 5,143,800 A | 9/1992 | George et al. | |
| 5,169,730 A | 12/1992 | Reichner et al. | |
| 5,170,124 A | 12/1992 | Blair et al. | |
| 5,302,470 A | 4/1994 | Okada et al. | |
| 5,441,821 A | 8/1995 | Merritt et al. | |

(Continued)

FOREIGN PATENT DOCUMENTS

JP    2004-247290 A    9/2004

(Continued)

OTHER PUBLICATIONS

B. T. Carvill, J.R. Hufton, M. Anand, and S. Sircar, Sorption-Enhanced Reaction Process, AICHE Journal, Oct. 1996, vol. 42, No. 10.*

(Continued)

*Primary Examiner*—Robert J Hill, Jr.
*Assistant Examiner*—Anthony Shumate
(74) *Attorney, Agent, or Firm*—Foley & Lardner LLP (57) ABSTRACT

A method of operating a fuel cell system includes providing a fuel inlet stream into a fuel cell stack, operating the fuel cell stack to generate electricity and a hydrogen containing fuel exhaust stream, separating at least a portion of hydrogen contained in the fuel exhaust stream using partial pressure swing adsorption, and providing the hydrogen separated from the fuel exhaust stream into the fuel inlet stream.

18 Claims, 6 Drawing Sheets

U.S. PATENT DOCUMENTS

| | | | |
|---|---|---|---|
| 5,498,487 | A | 3/1996 | Ruka et al. |
| 5,501,914 | A | 3/1996 | Satake et al. |
| 5,505,824 | A | 4/1996 | McElroy |
| 5,527,631 | A | 6/1996 | Singh et al. |
| 5,573,867 | A | 11/1996 | Zafred et al. |
| 5,601,937 | A | 2/1997 | Isenberg |
| 5,686,196 | A | 11/1997 | Singh et al. |
| 5,733,675 | A | 3/1998 | Dederer et al. |
| 5,741,605 | A | 4/1998 | Gillett et al. |
| 5,955,039 | A | 9/1999 | Dowdy |
| 6,013,385 | A | 1/2000 | DuBose |
| 6,051,125 | A | 4/2000 | Pham et al. |
| 6,106,964 | A | 8/2000 | Voss et al. |
| 6,176,897 | B1 | 1/2001 | Keefer |
| 6,280,865 | B1 | 8/2001 | Eisman et al. |
| 6,329,090 | B1 | 12/2001 | McElroy et al. |
| 6,403,245 | B1 | 6/2002 | Hunt |
| 6,436,562 | B1 | 8/2002 | DuBose |
| 6,451,466 | B1 | 9/2002 | Grasso et al. |
| 6,531,243 | B2 | 3/2003 | Thom |
| 6,623,880 | B1 | 9/2003 | Geisbrecht et al. |
| 6,821,663 | B2 | 11/2004 | McElroy et al. |
| 6,924,053 | B2 | 8/2005 | McElroy |
| 2001/0049035 | A1 | 12/2001 | Haltiner, Jr. et al. |
| 2001/0049037 | A1 | 12/2001 | St. Pierre et al. |
| 2002/0004157 | A1* | 1/2002 | Keefer et al. .......... 429/34 |
| 2002/0015867 | A1 | 2/2002 | Cargnelli et al. |
| 2002/0028362 | A1 | 3/2002 | Prediger et al. |
| 2002/0058175 | A1 | 5/2002 | Ruhl |
| 2002/0098394 | A1 | 7/2002 | Keefer et al. |
| 2002/0106544 | A1 | 8/2002 | Noetzel et al. |
| 2003/0157386 | A1 | 8/2003 | Gottmann et al. |
| 2003/0162067 | A1 | 8/2003 | McElroy |
| 2003/0196893 | A1 | 10/2003 | McElroy |
| 2003/0205641 | A1 | 11/2003 | McElroy |
| 2004/0005492 | A1* | 1/2004 | Keefer et al. .......... 429/34 |
| 2004/0081859 | A1 | 4/2004 | McElroy et al. |
| 2004/0191597 | A1 | 9/2004 | McElroy |
| 2004/0191598 | A1 | 9/2004 | Gottmann et al. |
| 2004/0197612 | A1 | 10/2004 | Keefer et al. |
| 2004/0202914 | A1 | 10/2004 | Sridhar et al. |
| 2004/0224193 | A1 | 11/2004 | Mitlitsky et al. |
| 2004/0229102 | A1 | 11/2004 | Jahnke et al. |
| 2005/0048334 | A1 | 3/2005 | Sridhar et al. |
| 2005/0164051 | A1 | 7/2005 | Venkataraman et al. |

FOREIGN PATENT DOCUMENTS

| | | | |
|---|---|---|---|
| WO | WO 2004/013258 | A1 | 2/2004 |
| WO | WO 2004/093214 | | 10/2004 |

OTHER PUBLICATIONS

U.S. Appl. No. 11/124,120, filed May 9, 2005, Velensa et al.
U.S. Appl. No. 11/188,118, filed Jul. 25, 2005, LeVan et al.
U.S. Appl. No. 11/188,123, filed Jul. 25, 2005, McElroy et al.
Berlier, Karl et al., "Adsorption of $CO_2$ on Microporous Materials. 1. On Activated Carbon and Silica Gel", J. Chem. Eng. Data, 1997, vol. 42, pp. 533-537.
EG & G, Parsons, Inc., SAIC. Fuel Cell Handbook. $5^{th}$ Edition. USDOE. Oct. 2000. 9-1-9-4; 9-12-9-14.
LeVan, M. Douglas et al., "Adsorption and Ion Exchange", Perry's Chemical Engineers' Handbook ($7^{th}$ Edition), 1997, 66 pgs.
Manchado, M. Cabrejas et al., "Adsorption of $H_2$, $O_2$, CO, and $CO_2$ on a γ-Alumina: Volumetric and Calorimetric Studies", Langmuir, vol. 10, 1994, pp. 685-691.
Olivier, Marie-Georges et al., "Adsorption of Light Hyrdocarbons and Carbon Dioxide on Silica Gel", J. Chem. Eng. Data, 1997, vol. 42, pp. 230-233.
Qi, Nan et al., "Adsorption equilibrium modeling for water on activated carbons", Carbon, vol. 43, 2005, pp. 2258-2263.
Rudisill, Edgar N. et al., "Coadsorption of Hydrocarbons and Water on BPL Activated Carbon", Ind. Eng. Chem. Res., 1992, vol. 31, pp. 1122-1130.
Sward, Brian K. et al., "Frequency Response Method for Measuring Mass Transfer Rates in Adsorbents via Pressure Perturbation", Adsorption, vol. 9, 2003, pp. 37-54.
Yong, Zou et al., "Adsorption of Carbon Dioxide on Basic Alumina at High Temperatures", J. Chem. Eng. Data, 2000, vol. 45, pp. 1093-1095.
"Type BPL Granular Carbon", Calgon Product Bulletin, Calgon Corporation, Activated Carbon Division, 2 pgs.
Levan, M. Douglas et al., "Fixed-Bed Adsorption of Gases: Effect of Velocity Variations on Transition Types", AIChE Journal, vol. 34, No. 6, Jun. 1988, pp. 996-1005.
Sward, Brian K. et al., "Simple Flow-Through Apparatus for Measurement of Mass Transfer Rates in Adsorbent Particles by Frequency Response", Fundamentals of Adsorption, K. Kaneko et al., eds., vol. 7, 2002, pp. 29-36. Published by IK International of Japan.
Walton, Krista S. et al., "A Novel Adsorption Cycle for $CO_2$ Recovery: Experimental and Theoretical Investigations of a Temperature Swing Compression Process", Revised Manuscript, submitted in 1995 to Separation Science & Technology, 30 pgs.
Yong, Zou et al., "Adsorption of carbon dioxide at high temperature—a review", Separation and Purification Technology, vol. 26, 2002, pp. 195-205.
Supplementary European Search Report dated May 26, 2009 in corresponding EP Application 06800265.8, five pages.

* cited by examiner

Figure 1.

FIG. 2A Feed 1 / Purge 2

FIG. 2B Dual Flush

FIG. 2C Purge 1 / Feed 2

FIG. 2D Dual Flush

FUEL CELL ANODE EXHAUST FUEL RECOVERY BY ADSORPTION

BACKGROUND OF THE INVENTION

The present invention relates generally to the field of fuel cell systems and more particularly to fuel cell systems with anode exhaust fuel recovery by partial pressure or temperature swing adsorption.

SUMMARY OF THE INVENTION

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

DETAILED DESCRIPTION OF THE PREFERRED EMBODIMENTS

The embodiments of the invention provide a system and method in which partial pressure swing adsorption (i.e., concentration swing adsorption) is used to separate hydrogen from a fuel cell stack fuel exhaust stream and to provide the hydrogen back into the fuel cell stack fuel inlet stream. The first four embodiments described below are directed to various partial pressure swing adsorption gas separation methods and devices which may be used to separate hydrogen from the fuel exhaust stream, while the fifth and sixth embodiments are directed to the fuel cell systems which use partial pressure swing adsorption methods and devices for hydrogen separation.

The first embodiment of the invention provides a four-step partial pressure swing adsorption (i.e., concentration swing adsorption) cycle for gas separation, such as for recovering fuel from the fuel (i.e., anode side) exhaust of a solid oxide fuel cell stack. Two beds packed with an adsorbent material, such as activated carbon, are used to adsorb carbon dioxide and water (i.e., water vapor) from the fuel exhaust, allowing hydrogen and carbon monoxide to pass through the beds. The beds are regenerated, preferably countercurrently, with air dried to modest relative humidities, such as about 30% to about 50% relative humidity. For example, dry air for regeneration may be developed in a temperature swing adsorption cycle using silica gel or activated alumina. Flush steps are used to recover additional hydrogen and to prevent air from contaminating the recovered fuel. The duration of the adsorption and regeneration (i.e., feeding and purging) steps is preferably at least 5 times longer, such as 10-50 times longer than the duration of the flush steps.

Thus, a reliable, energy-efficient cycle for optimum gas separation is provided. For example, the cycle is a high efficiency cycle for maximum recovery of hydrogen and maximum rejection of carbon dioxide and air, based on a partial pressure swing adsorption (also referred to herein as concentration swing adsorption) with countercurrent purge and cocurrent flush steps. Since the beds are preferably regenerated with air, the sweeping of air left in the bed at the end of regeneration back into the fuel cell stack is not desirable. Furthermore, at the start of a regeneration step, the bed taken off stream contains hydrogen in the gas phase. Recovery of this hydrogen is desirable. The flush steps are used to remove the air left in the bed at the end of regeneration to prevent providing this air back into the fuel cell stack, and to provide the hydrogen remaining in the bed at the start of a regeneration step into the fuel inlet of the fuel cell stack.

While the system and method of the first embodiment will be described and illustrated with respect to an adsorption system which separates carbon dioxide from the hydrogen in a solid oxide fuel stack fuel exhaust stream, it should be noted that the system and method of the first embodiment may be used to separate any multicomponent gas stream that is not part of a fuel cell system or that is part of a fuel cell system other than a solid oxide fuel cell system, such as a molten carbonate fuel cell system for example. Thus, the system and method of the first embodiment should not be considered limited to separation of hydrogen from carbon dioxide. The adsorbent material in the adsorbent beds may be selected based on the gases being separated.

Figure 1:
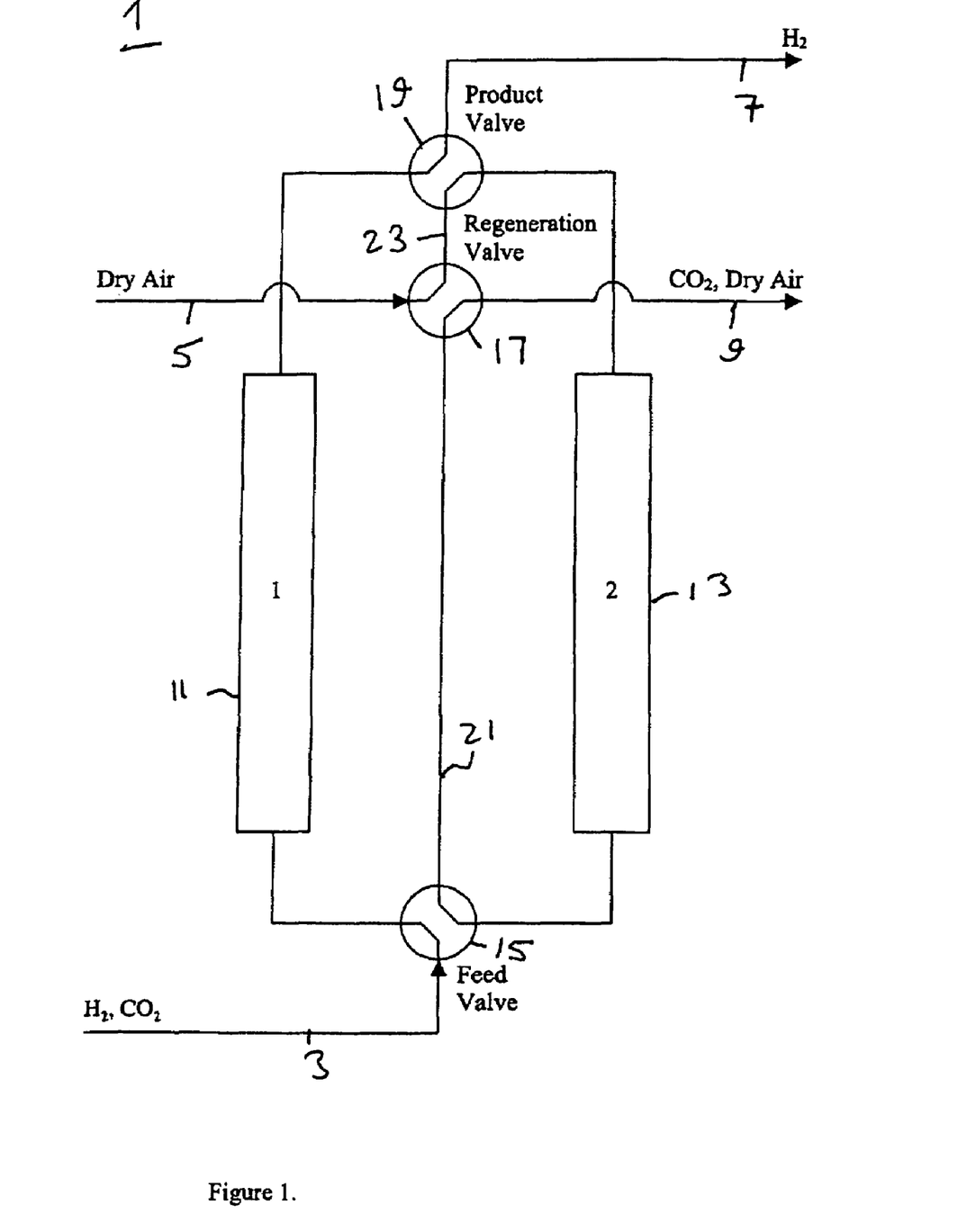
FIGS. 1, 2A, 2B, 2C, 2D, 3, and 4 are schematic diagrams of the partial pressure swing adsorption systems of the embodiments of the invention.

FIG. 1 illustrates a gas separation apparatus 1 of the first embodiment. The apparatus 1 contains a first feed gas inlet conduit 3, which in operation provides a feed gas inlet stream. If the apparatus 1 is used to separate hydrogen from a fuel cell stack fuel exhaust stream, then conduit 3 is operatively connected to the fuel cell stack anode exhaust. As used herein, when two elements are "operatively connected," this means that the elements are directly or indirectly connected to allow direct or indirect fluid flow from one element to the other. The apparatus 1 also contains a second purge gas inlet conduit 5, which in operation provides a purge gas inlet stream.

The apparatus contains a third feed gas collection conduit 7, which in operation collects at least one separated component of the feed gas. If the apparatus 1 is used to separate hydrogen from a fuel cell stack fuel exhaust stream and to recycle the hydrogen into the fuel inlet of the fuel cell stack, then conduit 7 is operatively connected to the fuel inlet of the fuel cell stack (i.e., either directly into the stack fuel inlet or to a fuel inlet conduit which is operatively connected to the stack fuel inlet). The apparatus also contains a fourth purge gas collection conduit 9, which in operation collects the feed gas outlet stream during the flush steps and collects the purge gas outlet stream during feed/purge steps.

Thus, if the apparatus 1 is used to separate hydrogen from a fuel cell stack fuel exhaust stream, then the first conduit 3 comprises a hydrogen, carbon dioxide, carbon monoxide and water vapor inlet conduit, the second conduit 5 comprises a dry air inlet conduit, the third conduit 7 comprises a hydrogen and carbon monoxide removal and recycling conduit and the fourth conduit 9 comprises a carbon dioxide and water vapor removal conduit.

The apparatus 1 also contains at least two adsorbent beds 11, 13. The beds may contain any suitable adsorbent material which adsorbs at least a majority, such as at least 80 to 95% of one or more desired components of the feed gas, and which allows a majority of one or more other components to pass through. For example, the bed material may comprise zeolite, activated carbon, silica gel or activated alumina adsorbent material. Activated carbon is preferred for separating hydrogen and carbon monoxide from water vapor and carbon dioxide in a fuel cell stack fuel exhaust stream. Zeolites adsorb carbon dioxide as well. However, they adsorb water very strongly, and a very dry gas should be used for regeneration, which is difficult to obtain. Thus, zeolite beds can preferably, but not necessarily, be used to separate a gas stream which does not contain water vapor because an apparatus which uses zeolite beds to separate a water vapor containing gas may experience a slow degradation of performance.

The apparatus 1 also comprises a plurality of valves which direct the gas flow. For example, the apparatus may contain three four-way valves with "double-LL" flow paths: a feed valve 15, a regeneration valve 17 and a product valve 19. The feed valve 15 is connected to the first conduit 3, to the two beds 11, 13 and to the regeneration valve 17 by conduit 21. The regeneration valve 17 is connected to the second and fourth conduits 5 and 9, respectively, to the feed valve 15 by conduit 21 and to the product valve 19 by conduit 23. The product valve 19 is connected to the third conduit 7, to the two beds 11, 13 and to the regeneration valve 17 by conduit 23. The four-way valves may be used to redirect two flows at a time. Such valves are available in a wide range of sizes, for example, from A-T Controls, Inc., Cincinnati, Ohio, USA. If desired, each 4-way valve may be replaced by two 3-way valves or four 2-way valves, or by an entirely different flow distribution system involving a manifold.

Thus, the valves 15, 17, 19 are preferably operated such that the purge gas inlet stream is provided into the beds 11, 13 countercurrently with the feed gas inlet stream during the purge steps and cocurrently with the feed gas inlet stream during the flush steps. In other words, the first conduit 3 is operatively connected to the first and the second beds 11, 13 to provide the feed gas inlet stream into the first and the second beds in a first direction. The second conduit 5 is operatively connected to the first and the second beds 11, 13 through valves 17, 19 such that the purge gas inlet stream is provided into each of the first and the second beds 11, 13 in a different direction from the first direction (such as in the opposite direction) during the first and the second feed/purge steps, and the purge gas inlet stream is provided into the first and the second beds in the first direction (i.e., the same direction and the feed gas inlet stream) during the first and the second flush steps.

Figure 2A:
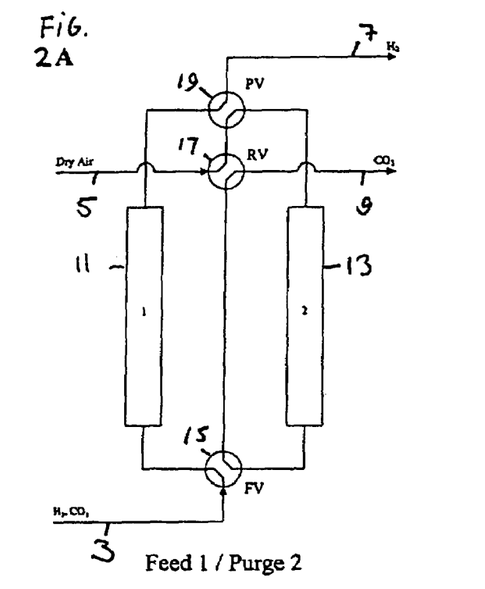

FIGS. 2A-2D illustrate the steps in the operation cycle of system 1. FIG. 2A shows the apparatus 1 during a first feed/purge step in which the first bed 11 is fed with a feed gas inlet stream, such as the fuel stack fuel exhaust stream, while the second bed 13, is fed with a purge gas, such as dried air, to regenerate the second bed 13.

The feed gas inlet stream is provided from conduit 3 through valve 15 into the first adsorbent bed 11. For a feed gas which contains hydrogen, carbon monoxide, carbon dioxide and water vapor, the majority of the hydrogen and carbon monoxide, such as at least 80-95% passes through the first bed 11, while a majority of the carbon dioxide, such as at least 80-95%, and much of the water vapor are adsorbed in the first bed. The feed gas outlet stream comprising at least one separated component of the feed gas, such as hydrogen and carbon monoxide, passes through valve 19 and is collected at a first output, such as the third conduit 7.

The purge gas inlet stream, such as dried air, is provided from the second conduit 5 through valve 17, conduit 23 and valve 19 into a second adsorbent bed 13. The purge gas outlet stream passes through conduit 21 and valves 15 and 17, and is collected at a second output, such as the fourth conduit 9.

In the first feed/purge step, the valve positions are such that valve 15 directs the feed to the first bed 11 and valve 19 directs the hydrogen product away to conduit 7. Valve 17 is positioned to sweep dry air counter currently through the second bed to remove carbon dioxide that was previously adsorbed. Some of the water in the feed gas steam is adsorbed on the adsorbent material, such as activated carbon, at the inlet of the first bed 11 and will be removed from the bed 11 when it is regenerated in a subsequent step. Carbon monoxide will be passed through the first bed 11 as the carbon dioxide wave advances.

Figure 2B:
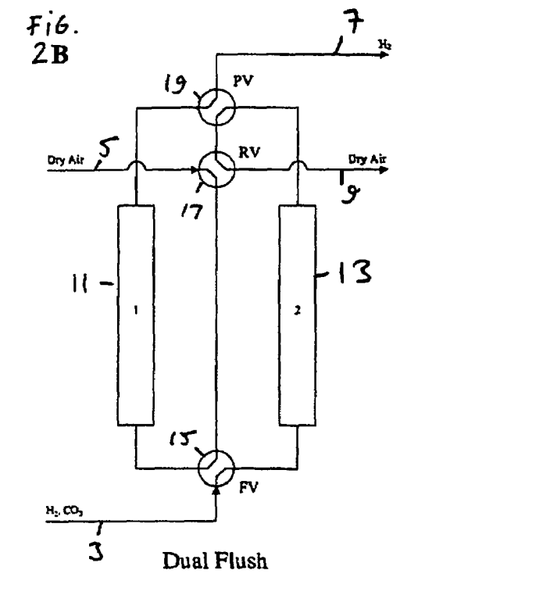

FIG. 2B illustrates the apparatus 1 in a first flush step which is conducted after the first feed/purge step. In this step, the feed valve 15 and the regeneration valve 17 switch flow directions from the prior step, while the product valve 19 does not.

The purge gas inlet stream is provided from conduit 5 through valves 17 and 15 and conduit 21 into the first adsorbent bed 11. Preferably, this purge gas inlet stream is provided into the first bed 11 in the same direction as the feed gas stream in the previous step. The purge gas outlet stream, which comprises at least one component of the feed gas, such as hydrogen, that was trapped in a void volume of the first adsorbent bed, is collected at the first output, such as conduit 7.

The feed gas inlet stream is provided from conduit 3 through valve 15 into the second adsorbent bed 13. The feed gas outlet stream, which comprises a portion of the purge gas, such as air, that was trapped in a void volume of the second bed 13, passes through valves 19 and 17 and conduit 23 and is collected at an output different from the first output, such as at conduit 9.

Thus, in the first flush step, hydrogen trapped in the void volume of the first bed 11 is swept to product by the entering air and desorbing carbon dioxide. Air trapped in the void volume of the second bed 13 is purged from the bed 13 by the entering feed gas. This step improves the overall efficiency of the process by continuing to recover hydrogen that is trapped from the prior feed step and preventing air from the prior purge step from contaminating the hydrogen containing product after the next valve switch. This flush step is short, such as less than 1/5 of the time of the prior feed/purge step, such as 1/10 to 1/50 of the time of the prior step. For example, for an about 90 second feed/purge step, the flush step may be about 4 seconds.

Figure 2C:
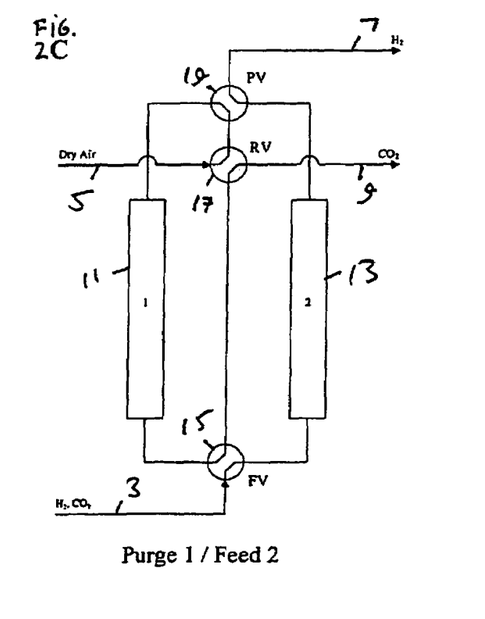

FIG. 2C shows the apparatus 1 during a second feed/purge step which is conducted after the first flush step. In this step, the second bed 13 is fed with a feed gas stream, such as the fuel stack fuel exhaust stream, while the first bed 11 is fed with a purge gas, such as dried air, to regenerate the first bed 11. Thus, in this step, the flow paths in valves 17 and 19 switch. This step is generally the same as the first feed/purge step, but with the beds reversed.

The feed gas inlet stream is provided from conduit 3 through valve 15 into the second adsorbent bed 13. Preferably the feed gas inlet stream is provided into the second bed 13 in the opposite (i.e., countercurrent) direction from the direction in which the purge gas inlet stream is provided into the second bed 13 in the first purge step. The feed gas outlet stream, which comprises at least one separated component of the feed gas, such as hydrogen and carbon monoxide, is collected at the first output, such as in the third conduit 7. The purge gas inlet stream is provided from conduit 5 through valves 17 and 19 and conduit 23 into the first adsorbent bed 11. Preferably the purge gas inlet stream is provided into the first bed 11 in the opposite (i.e., countercurrent) direction from the direction in which the feed gas inlet stream is provided into the first bed 11 in the first feed step. The purge gas outlet stream is collected from the first bed 11 at an output different from the first output, such as at the fourth conduit 9.

Figure 2D:
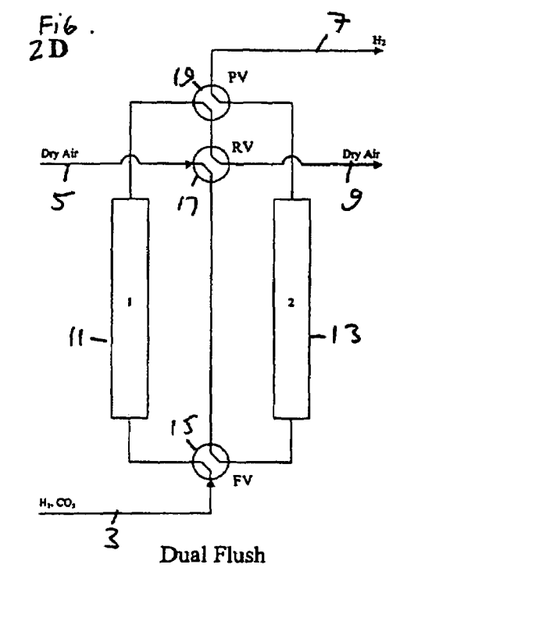

FIG. 2D illustrates the apparatus 1 in a second flush step which is conducted after the second feed/purge step. In this step, the feed valve 15 and the regeneration valve 17 switch flow directions from the prior step, while the product valve 19 does not. This step is similar to the first flush steps, but with the beds reversed.

The purge gas inlet stream is provided from conduit 5 through valves 17 and 15 and conduit 21 into the second adsorbent bed 13. Preferably, this steam is provided into the bed 13 in the same direction as the feed gas inlet stream in the prior two steps. The purge gas outlet stream, which comprises at least one component of the feed gas, such as hydrogen, that was trapped in a void volume of the second adsorbent bed 13, is collected at the first output, such as the third conduit 7.

The feed gas inlet stream is provided from conduit 3 through valve 15 into the first adsorbent bed 11. The feed gas outlet stream, which comprises a portion of the purge gas, such as air, that was trapped in a void volume of the first bed 11, is collected at an output different from the first output, such as at the fourth conduit 9. Then the first feed/purge step shown in FIG. 2A is repeated. In general, the four steps described above are repeated a plurality of times in the same order.

It should be noted the feed gas inlet stream is preferably provided in each of the first 11 and the second 13 adsorbent beds in the same direction in the steps described above. In the first and the second flush steps, the purge gas inlet stream is provided into each of the first and the second adsorbent beds in the same direction as the feed gas inlet stream direction. In contrast, in the first and the second feed/purge steps, the purge gas inlet stream is provided into each of the first and the second adsorbent beds in a different direction, such as the opposite direction, from the feed gas inlet stream direction.

The countercurrent purge gas inlet stream flow is advantageous because it is believed that it will reduce the amount of carbon dioxide in the hydrogen product stream compared to a co-current flow during the purge steps. Some water will adsorb near the inlet of the carbon bed during the feed step. During the purge or regeneration step, the bed is purged counter currently with dried air. Because activated carbon is used for adsorption of carbon dioxide and activated carbon does not adsorb water appreciably at moderately low relative humidities, in order to prevent accumulation of water in the bed, the regeneration purge only needs to be dried to a relative humidity of roughly 30 to 50%. During the feed step, carbon monoxide will be pushed into the product (with the hydrogen) by using the beds efficiently for carbon dioxide removal (i.e., by advancing the carbon dioxide wave reasonably far into the beds). The countercurrent regeneration step will reduce the level of carbon dioxide in the hydrogen stream in comparison to a cocurrent regeneration step. The dual flush step will maximize both hydrogen recovery and air rejection from the hydrogen product.

As noted above, in the partial pressure swing adsorption method, the feed gas inlet stream is not pressurized prior to being provided into the first and the second adsorbent beds. Furthermore, the above four steps are preferably conducted without external heating of the adsorbent beds.

In operation, the first bed 11 performs the following functions. It receives the feed gas inlet stream from the first conduit 3 and provides at least one separated component of the feed gas to the third conduit 7 in a first feed/purge step. It receives the purge gas inlet stream from the second conduit 5 and provides a purge gas outlet stream, which comprises at least one component of the feed gas that was trapped in a void volume of the first bed to the third conduit 7 in a first flush step. It receives a purge gas inlet stream from the second conduit 5 and provides a purge gas outlet stream to an output different from the third conduit 7, such as the fourth conduit 9, in a second feed/purge step. It also receives the feed gas inlet stream from the first conduit 3 and provides a feed gas outlet stream, which comprises a portion of the purge gas that was trapped in a void volume of the first bed, to at an output different from the third conduit 7, such as the fourth conduit 9, in a second flush step.

In operation, the second bed 13 performs the following functions. It receives a purge gas inlet stream from the second conduit 5 and provides a purge gas outlet stream to at an output different from the third conduit 7, such as the fourth conduit 9, in a first feed/purge step. It receives the feed gas inlet stream from the first conduit 3 and provides the feed gas outlet stream, which comprises a portion of the purge gas that was trapped in a void volume of the second bed 13, to an output different from the third conduit 7, such as the fourth conduit 9, in a first flush step. It receives the feed gas inlet stream from the first conduit 3 and provides the feed gas outlet stream comprising at least one separated component of the feed gas to the third conduit 7 in a second feed/purge step. It also receives the purge gas inlet stream from the second conduit 5 and provides the purge gas outlet stream, which comprises at least one component of the feed gas that was trapped in a void volume of the second bed 13 to the third conduit 7 in a second flush step.

Thus, at least a majority of the carbon dioxide and much of the water vapor in the feed gas inlet stream is adsorbed by the first 11 and the second 13 adsorbent beds during the first and the second feed/purge steps, respectively. The adsorbed carbon dioxide and water vapor is removed from the first and the second adsorbent beds by the purge gas inlet stream during the second and the first feed/purge steps, respectively. The removed carbon dioxide and water vapor are collected with the purge gas outlet stream at the second output during the second and the first feed/purge steps.

It is noted that the regeneration (i.e., purging) of the bed will be accompanied by a cooling of the bed as $CO_2$ desorbs. It is believed that this will shift adsorption equilibrium to lower partial pressures for $CO_2$ and will slow regeneration. This and the expanding velocity front during regeneration may be taken into account in setting the purge gas (i.e., dry air) flow rate. For example, the inlet air volumetric flowrate for regeneration may be greater than, such as 1.5 times greater than, the outlet flowrate of hydrogen and carbon monoxide. It is believed that allowing for desorption of carbon dioxide during regeneration, the outlet flowrate for regeneration will exceed the inlet flowrate of the feed.

The apparatus 1 may have the following non-limiting features. The adsorbent bed material preferably comprises activated carbon for hydrogen separation from the fuel cell stack fuel exhaust. For example, Calgon BPL activated carbon, 6×16 or 4×10 mesh may be used. The beds 11, 13 may be cylindrical beds 2-12 inches in diameter and 1-6 feed long, such as 6 inches in diameter and 3 feet long, for example, depending on the size of the fuel cell stack and on the flow rate of the gases. The duration of the feed/purge steps may be more than 1 minute while the duration of the flush steps may be a few seconds. For example, the feed/purge duration may be 1 to 3 minutes, such as 1.5 minutes, while the flush duration may be 3-5 seconds, such as 4 seconds.

The method of the first embodiment is designed to provide a high hydrogen recovery (with flush steps), high carbon dioxide separation (with flush and countercurrent regeneration steps), high degree of air rejection (with flush steps), regeneration using a purge gas having a relatively low dryness, such as air having 30-50% relative humidity, low energy requirements, high robustness (i.e., easily tunable and adaptable to changes in operating conditions), simple operation with few moving parts, high scalability, and low to moderate capital cost.

The dry air for the purge steps may be obtained by any suitable method. For example, the dry air can easily be achieved using temperature swing adsorption cycle with water vapor absorbing beds, such as silica gel or activated alumina beds. Silica gel has a somewhat higher capacity for water than alumina. However, it will fracture if very dry and contacted with a water mist. If this is likely, a protective layer of a non-decrepitating silica gel can be used, or activated alumina can be used.

The temperature swing adsorption cycle uses two beds (i.e., beds other than beds 11, 13 shown in FIG. 1). One bed is used in the adsorption mode while the other is being regenerated (heated and cooled). The steps in the cycle are as follows.

In a first adsorption step, a working capacity of 10 mol $H_2O$/kg of silica gel can be used. Considering the worst case, the air would be saturated with water at 30° C. The partial pressure of water in air saturated at 30° C. is 0.042 bar. For example, to produce a dry air flow rate of 144 slpm from this wet air, 0.28 mol/min of water must be removed. At the designated working capacity, silica gel is consumed at a rate of 0.028 kg/min. A bed containing 2 kg of silica gel can remain on stream for 72 minutes. Given a specific gravity of silica gel of 0.72 (corresponding to a bulk density of 45 lb/ft$^3$), the bed will dry 4300 bed volumes of feed during this time (with 12,000 temperature corrected liters of wet feed dried by a bed 2.8 liters in volume). The dried air is provided through conduit 5 into the apparatus 1.

In a second heating step, the bed is heated counter currently with a warm feed (e.g., 80° C. or other suitable moderately warm or hot temperature). The bed is heated after about 1000 bed volumes have been passed into it. Somewhat more energy will be required to heat metal parts also.

In a third cooling step, the bed is cooled cocurrently (same direction as adsorption) with the wet air feed. It will take about 800 bed volumes to cool the bed. This will deposit water at the bed inlet and use up some of the capacity for adsorption, reducing it to about 3500 bed volumes. While the first bed is undergoing the adsorption step, the second bed is undergoing heating or cooling steps. While the second bed is undergoing the adsorption step, the first bed is undergoing heating or cooling steps.

It should be understood that the calculation above is highly conservative and approximate. It is based on air for regeneration that is available saturated with water at 30° C. Typically, the air will be drier. The regeneration requirements for the carbon beds are mild (e.g., 30-50% RH). Indeed, on a cool day or a dry day, drying the regeneration air would not be necessary. Also, if the driers went out of service for a short time, the process would not be endangered.

Figure 3:
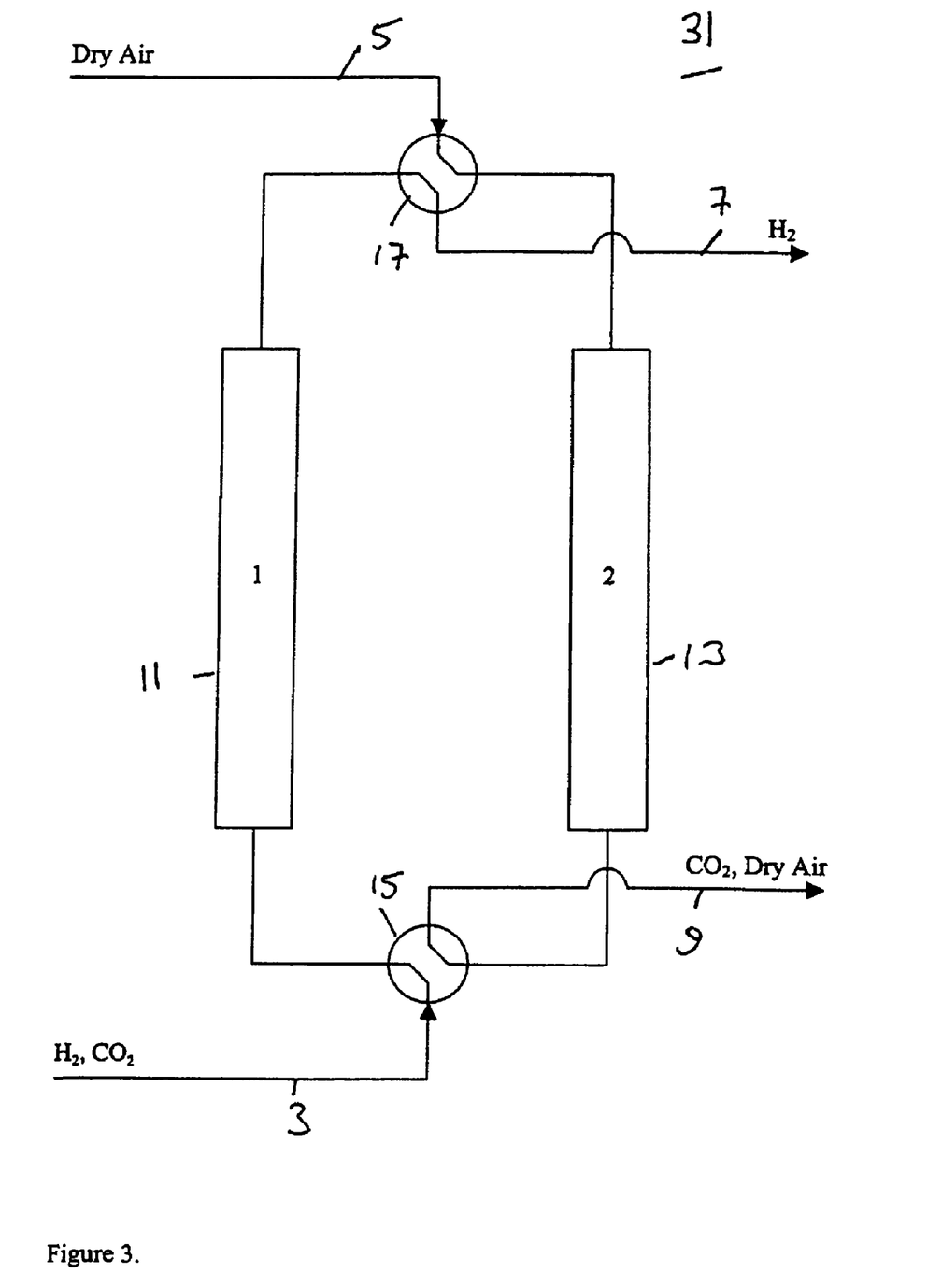

In a second embodiment of the invention, the apparatus 31 operates with a countercurrent purge but with no flush steps. FIG. 3 shows apparatus 31 using a simple cycle with a countercurrent purge but no flush. Two instead of three four-way valves 15, 17 are used. The apparatus 31 and method of using this apparatus are otherwise similar to the apparatus 1 and method of the first embodiment, except that the first and second flush steps are omitted.

The advantage of countercurrent purge is that carbon dioxide is removed from the bed outlet for the feed step, and higher hydrogen purities will result. But without the flush, about 5% of the hydrogen is not recovered, and air will somewhat contaminate the hydrogen containing product in conduit 7.

Figure 4:
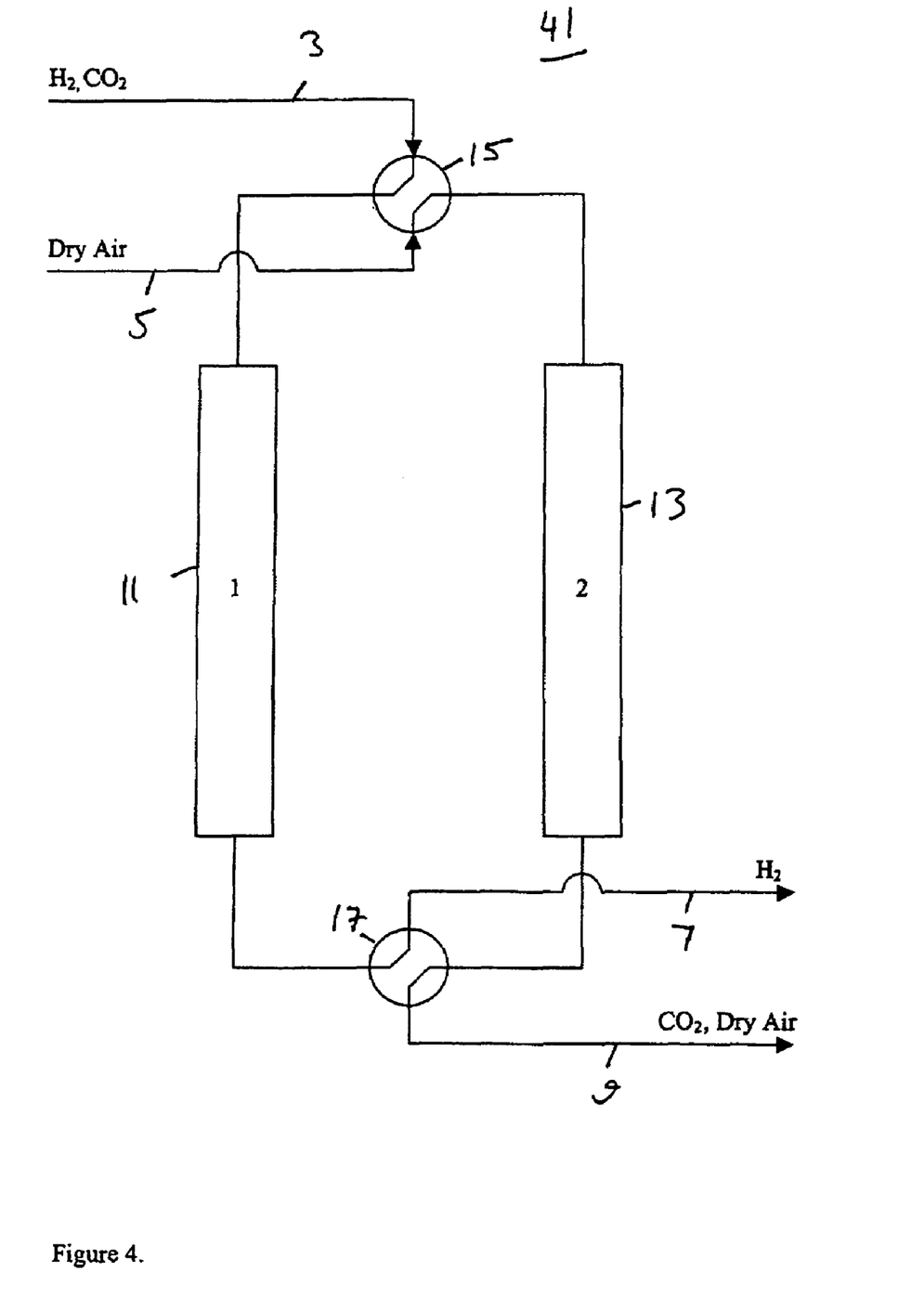

In a third embodiment of the invention, the apparatus 41 operates with a cocurrent purge with the flush steps. FIG. 4 shows the apparatus 41 using a cocurrent purge and flush. It also uses two instead of three four-way valves. The apparatus 41 and method of the third embodiment in many respects resembles the apparatus 1 and method of the first embodiment, except that the purge gas inlet stream is provided into the beds in the purge steps in the same direction as the feed gas inlet stream in the prior feed steps. The negative aspect of this cocurrent cycle is that any $CO_2$ left in the bed will be most concentrated near the outlet end for the adsorption step and will somewhat contaminate the hydrogen containing product provided to conduit 7.

In a fourth embodiment of the invention, the air purge gas is not pre-dried. In this embodiment, the apparatus may contain two or three carbon dioxide adsorbing beds. Some three-bed cycles that do not need dried air. For example, a bed of carbon used for carbon dioxide adsorption will slowly accumulate water from both the fuel cell stack fuel exhaust and the wet regeneration air. The bed could be used for many cycles, with decreasing capacity before it is completely regenerated. If regenerated counter currently, it would last longer than if regenerated cocurrently because water deposited during feed steps would be partially removed by the regenerating air and vice versa. Nevertheless, the bed would accumulate water over time.

In this embodiment, three beds would be used, with two actively running adsorption and regeneration cycles, as in the first embodiment, while a third bed is being more thoroughly regenerated by a thermal swing regeneration or by purging with a dried gas.

Furthermore, if atmospheric air were reasonably dry (i.e., RH <50% at 30° C.), then the partial pressure adsorption cycle may be used with two beds in exactly the same configuration as in the first embodiment. The purge gas would not deposit a significant amount of water on the carbon, and the countercurrent sweep of the air during regeneration would remove water adsorbed from the fuel cell stack fuel exhaust feed. Thus, if dry air was available from the atmosphere, then a separate air drying step is not needed.

The fifth and sixth embodiments of the invention illustrate how the adsorption apparatus of the first through fourth embodiments is used together with a fuel cell system, such as a solid oxide fuel cell system. It should be noted that other fuel cell systems may also be used.

In the system of the fifth embodiment, a fuel humidifier is used to humidify the fuel inlet stream provided into the fuel cell stack. In the system of the sixth embodiment, the fuel humidifier may be omitted. A portion of the fuel cell stack fuel exhaust stream is directly recycled into the fuel inlet stream to humidify the fuel inlet steam. Another portion of the fuel cell stack fuel exhaust stream is provided into the adsorption apparatus of any of the first four embodiments, and the separated hydrogen and carbon monoxide are then provided into the fuel inlet stream.

Figure 5:
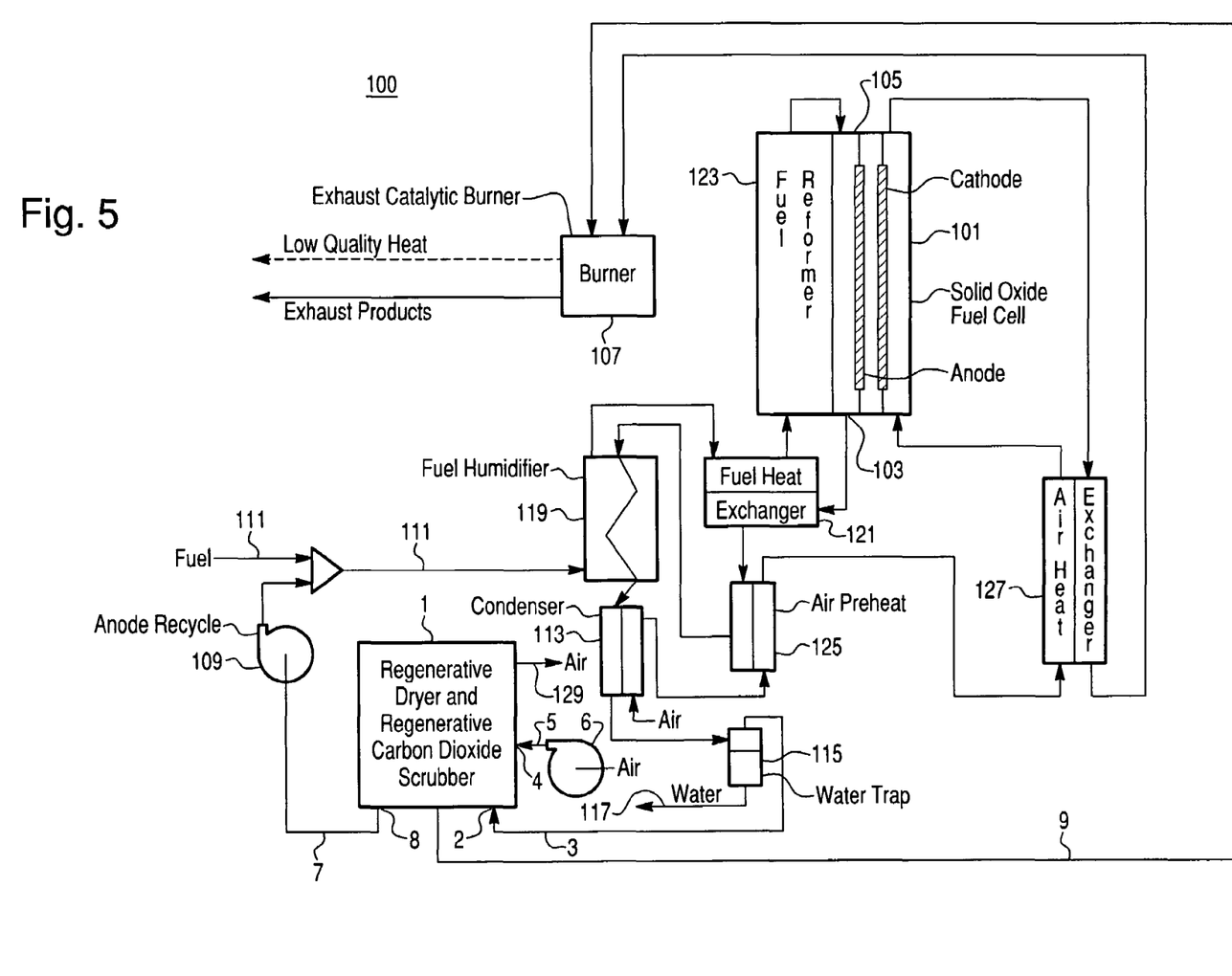
FIGS. 5 and 6 are schematic diagrams of fuel cell systems of the embodiments of the invention which incorporate the partial pressure swing adsorption systems.

FIG. 5 illustrates a fuel cell system 100 of the fifth embodiment. The system 100 contains a fuel cell stack 101, such as a solid oxide fuel cell stack (illustrated schematically to show one solid oxide fuel cell of the stack containing a ceramic electrolyte, such as yttria stabilized zirconia (YSZ), an anode electrode, such as a nickel-YSZ cermet, and a cathode electrode, such as lanthanum strontium manganite).

The system also contains a partial pressure swing adsorption ("PPSA") unit 1 of any of the first four embodiments comprising a plurality of adsorbent beds (not shown for clarity). The PPSA unit 1 acts as a regenerative dryer and carbon dioxide scrubber.

The system 100 also contains the first conduit 3 which operatively connects a fuel exhaust outlet 103 of the fuel cell stack 101 to a first inlet 2 of the partial pressure swing adsorption unit 1. For example, the first inlet 2 may comprise the feed valve 15 and/or an inlet to one of the beds 11, 13, shown in FIG. 1. The system 100 also contains the second conduit 5 which operatively connects a purge gas source, such as a dried or atmospheric air source 6 to a second inlet 4 of the partial pressure swing adsorption unit 1. The purge gas source 6 may comprise an air blower or compressor and optionally a plurality of temperature swing cycle adsorption beds.

The system also contains a third conduit 7 which operatively connects an outlet 8 of the partial pressure swing adsorption unit 1 to a fuel inlet 105 of the fuel cell stack 101. Preferably, the system 100 lacks a compressor which in operation compresses the fuel cell stack fuel exhaust stream to be provided into the partial pressure swing adsorption unit 1.

The system 100 also contains the fourth conduit 9 which removes the exhaust from the unit 1. The conduit 9 may be connected to a catalytic burner 107 or to an atmospheric vent.

The system 100 also contains a blower or a heat driven compressor 109 having an inlet which is operatively connected to the partial pressure swing adsorption unit 1 and an outlet which is operatively connected to a fuel inlet 105 of the fuel cell stack 101. For example, conduit 7 connects the blower or compressor 109 to the unit 1. In operation, the blower or compressor 109 controllably provides a desired amount of hydrogen and carbon monoxide separated from a fuel cell stack fuel exhaust stream into the fuel cell stack fuel inlet stream. Preferably, the device 109 provides the hydrogen and carbon monoxide into a fuel inlet conduit 111 which is operatively connected to the a fuel inlet 105 of the fuel cell stack 101. Alternatively, the device 109 provides the hydrogen and carbon monoxide directly into the fuel inlet 105 of the fuel cell stack 101.

The system 100 also contains a condenser 113 and water separator 115 having an inlet which is operatively connected to a fuel cell stack fuel exhaust 103 and an outlet which is operatively connected to an inlet 2 of the partial pressure swing adsorption unit 1. The condenser 113 and water separator 115 may comprise a single device which condenses and separates water from the fuel exhaust stream or they may comprise separate devices. For example, the condenser 113 may comprise a heat exchanger where the fuel exhaust stream is cooled by a cool counter or co-flow air stream to condense the water. The air stream may comprise the air inlet stream into the fuel cell stack 101 or it may comprise a separate cooling air stream. The separator 115 may comprise a water tank which collects the separated water. It may have a water drain 117 used to remove and/or reuse the collected water.

The system 100 further contains a fuel humidifier 119 having a first inlet operatively connected to a hydrocarbon fuel source, such as the hydrocarbon fuel inlet conduit 111, a second inlet operatively connected to the fuel cell stack fuel exhaust 103, a first outlet operatively connected to the fuel cell stack fuel inlet 105, and a second outlet operatively connected to the condenser 113 and water separator 115. In operation, the fuel humidifier 119 humidifies a hydrocarbon fuel inlet stream from conduit 111 containing the recycled hydrogen and carbon monoxide using water vapor contained in a fuel cell stack fuel exhaust stream. The fuel humidifier may comprise a polymeric membrane humidifier, such as a Nafion® membrane humidifier, an enthalpy wheel or a plurality of water adsorbent beds, as described for example in U.S. Pat. No. 6,106,964 and in U.S. application Ser. No. 10/368,425, both incorporated herein by reference in their entirety. For example, one suitable type of humidifier comprises a water vapor and enthalpy transfer Nafion® based, water permeable membrane available from Perma Pure LLC. The humidifier passively transfers water vapor and enthalpy from the fuel exhaust stream into the fuel inlet stream to provide a 2 to 2.5 steam to carbon ratio in the fuel inlet stream. The fuel inlet stream temperature may be raised to about 80 to about 90 degrees Celsius in the humidifier.

The system 100 also contains a recuperative heat exchanger 121 which exchanges heat between the stack fuel exhaust stream and the hydrocarbon fuel inlet stream being provided from the humidifier 119. The heat exchanger helps to raise the temperature of the fuel inlet stream and reduces the temperature of the fuel exhaust stream so that it may be further cooled in the condenser and such that it does not damage the humidifier.

If the fuel cells are external fuel reformation type cells, then the system 100 contains a fuel reformer 123. The reformer 123 reforms a hydrocarbon fuel inlet stream into hydrogen and carbon monoxide containing fuel stream which is then provided into the stack 101. The reformer 123 may be heated radiatively, convectively and/or conductively by the heat generated in the fuel cell stack 101 and/or by the heat generated in an optional burner/combustor, as described in U.S. patent application Ser. No. 11/002,681, filed Dec. 2, 2004, incorporated herein by reference in its entirety. Alternatively, the external reformer 123 may be omitted if the stack 101 contains cells of the internal reforming type where reformation occurs primarily within the fuel cells of the stack.

Optionally, the system 100 also contains an air preheater heat exchanger 125. This heat exchanger 125 heats the air inlet stream being provided to the fuel cell stack 101 using the heat of the fuel cell stack fuel exhaust. If desired, this heat exchanger 125 may be omitted.

The system 100 also preferably contains an air heat exchanger 127. This heat exchanger 127 further heats the air inlet stream being provided to the fuel cell stack 101 using the heat of the fuel cell stack air (i.e., oxidizer or cathode) exhaust. If the preheater heat exchanger 125 is omitted, then the air inlet stream is provided directly into the heat exchanger 127 by a blower or other air intake device.

The system 100 of the fifth embodiment operates as follows. A fuel inlet stream is provided into the fuel cell stack 101 through fuel inlet conduit 111. The fuel may comprise any suitable fuel, such as a hydrocarbon fuel, including but not limited to methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, $H_2$ gas or their mixtures. For example, the mixture may comprise syngas derived from coal or natural gas reformation.

The fuel inlet stream passes through the humidifier 119 where humidity is added to the fuel inlet stream. The humidified fuel inlet stream then passes through the fuel heat exchanger 121 where the humidified fuel inlet stream is heated by the fuel cell stack fuel exhaust stream. The heated and humidified fuel inlet stream is then provided into a reformer 123, which is preferably an external reformer. For example, reformer 123 may comprise a reformer described in U.S. patent application Ser. No. 11/002,681, filed on Dec. 2, 2004, incorporated herein by reference in its entirety. The fuel reformer 123 may be any suitable device which is capable of partially or wholly reforming a hydrocarbon fuel to form a carbon containing and free hydrogen containing fuel. For example, the fuel reformer 123 may be any suitable device which can reform a hydrocarbon gas into a gas mixture of free hydrogen and a carbon containing gas. For example, the fuel reformer 123 may comprise a catalyst coated passage where a humidified biogas, such as natural gas, is reformed via a steam-methane reformation reaction to form free hydrogen, carbon monoxide, carbon dioxide, water vapor and optionally a residual amount of unreformed biogas. The free hydrogen and carbon monoxide are then provided into the fuel (i.e., anode) inlet 105 of the fuel cell stack 101. Thus, with respect to the fuel inlet stream, the humidifier 119 is located upstream of the heat exchanger 121 which is located upstream of the reformer 123 which is located upstream of the stack 101.

The air or other oxygen containing gas (i.e., oxidizer) inlet stream is preferably provided into the stack 101 through a heat exchanger 127, where it is heated by the air (i.e., cathode) exhaust stream from the fuel cell stack. If desired, the air inlet stream may also pass through the condenser 113 and/or the air preheat heat exchanger 125 to further increase the temperature of the air before providing the air into the stack 101.

Once the fuel and air are provided into the fuel cell stack 101, the stack 101 is operated to generate electricity and a hydrogen containing fuel exhaust stream. The fuel exhaust stream (i.e., the stack anode exhaust stream) is provided from the stack fuel exhaust outlet 103 into the partial pressure swing adsorption unit 1. At least a portion of hydrogen contained in the fuel exhaust stream is separated in the unit 1 using a partial pressure swing adsorption. The hydrogen separated from the fuel exhaust stream in the unit 1 is then provided back into the fuel inlet stream. Preferably, the hydrogen is provided back into the fuel inlet conduit 111 upstream of the humidifier 119.

The fuel exhaust stream is provided into the unit 1 as follows. The fuel exhaust stream may contain hydrogen, water vapor, carbon monoxide, carbon dioxide, some unreacted hydrocarbon gas, such as methane and other reaction by-products and impurities. For example, the fuel exhaust may have a flow rate of between 160 and 225 slpm, such as about 186 to about 196 slpm, and may comprise between about 45 to about 55%, such as about 48-50% hydrogen, about 40 to about 50%, such as about 45-47% carbon dioxide, about 2% to about 4%, such as about 3% water and about 1% to about 2% carbon monoxide.

This exhaust stream is first provided into the heat exchanger 121, where its temperature is lowered, preferably to less than 200 degrees Celsius, while the temperature of the fuel inlet stream is raised. If the air preheater heat exchanger 125 is present, then the fuel exhaust stream is provided through this heat exchanger 125 to further lower its temperature while raising the temperature of the air inlet stream. The temperature may be lowered to 90 to 110 degrees Celsius for example.

The fuel exhaust stream is then provided into the fuel humidifier 119 where a portion of the water vapor in the fuel exhaust stream is transferred to the fuel inlet stream to humidify the fuel inlet stream. The fuel exhaust stream is then provided into the condenser 113 where it is further cooled to condense additional water vapor from the fuel exhaust stream. The fuel exhaust stream may be cooled in the condenser by the fuel cell stack air inlet stream or by a different air inlet stream or by another cooling fluid stream. The water condensed from the fuel exhaust stream is collected in the liquid state in the water separator 115. Water may be discharged from the separator 115 via conduit 117 and then drained away or reused.

The remaining fuel exhaust stream gas is then provided from the separator 115 as the feed gas inlet stream into inlet 2 of the partial pressure swing adsorption unit 1 via conduit 3. Furthermore, the purge gas inlet stream, such as a dried air stream is provided into the unit 1 from blower or compressor 6 through conduit 5 into inlet 4. If desired, the air stream may be dried using additional adsorbent beds in a temperature swing adsorption cycle before being provided into adsorbent beds 11, 13 of the unit 1. In this case, the heated air used in the temperature swing adsorption cycle to dry the silica gel or alumina in the adsorbent beds may be removed from unit 1 via a vent conduit 129.

Thus, the fuel exhaust stream comprises hydrogen, carbon monoxide, water vapor, carbon dioxide as well as possible impurities and unreacted hydrocarbon fuel. During the separation step in unit 1, at least a majority of the carbon dioxide and much of the water vapor in the fuel exhaust stream are adsorbed in at least one adsorbent bed 11, 13 while allowing at least a majority of the hydrogen and carbon monoxide in the fuel exhaust stream to be passed through the at least one adsorbent bed. Specifically, unpressurized fuel exhaust stream is provided into the first adsorbent bed 11 to adsorb at least a majority of the carbon dioxide remaining in the fuel exhaust stream in the first adsorbent bed until the first adsorbent bed is saturated, while the second adsorbent bed 13 is regenerated by providing air having a relative humidity of 50% or less at about 30 degrees Celsius through the second adsorbent bed to desorb adsorbed carbon dioxide and water vapor. After the first bed 11 is saturated with carbon dioxide, the unpressurized fuel exhaust stream is provided into the second adsorbent bed 13 to adsorb at least a majority of the remaining carbon dioxide in the fuel exhaust stream in the second adsorbent bed until the second adsorbent bed is saturated while regenerating the first adsorbent bed by providing air having a relative humidity of 50% or less at about 30 degrees Celsius through the first adsorbent bed 11 to desorb the adsorbed carbon dioxide and water vapor.

The hydrogen and carbon monoxide separated from the fuel exhaust stream (i.e., feed gas outlet stream) are then removed from unit 1 through outlet 8 and conduit 7 and provided into the hydrocarbon fuel inlet stream in the fuel inlet conduit 111. Preferably, a blower or compressor 109 located in fluid communication with conduit 7 is used to controllably provide a desired amount of hydrogen and carbon monoxide separated from the fuel exhaust stream into the fuel inlet stream. The blower or compressor 109 may be operated by a computer or by an operator to controllably provide a desired amount of hydrogen and carbon monoxide into the fuel inlet stream, and may vary this amount based on any suitable parameter. The parameters include: i) detected or observed conditions of the system 100 (i.e., changes in the system operating conditions requiring a change in the amount of hydrogen or CO in the fuel inlet stream); ii) previous calculations provided into the computer or conditions known to the operator which require a temporal adjustment of the hydrogen or CO in the fuel inlet stream; and/or iii) desired future changes, presently occurring changes or recent past changes in the operating parameters of the stack 101, such as changes in the electricity demand by the users of electricity generated by the stack, etc. Thus, the blower or compressor may controllably vary the amount of hydrogen and carbon monoxide provided into the fuel inlet stream based on the above described and/or other criteria. Since the hydrogen and carbon monoxide are cooled to 200 degrees Celsius or less, a low temperature blower may be used to controllably provide the hydrogen and carbon monoxide into the conduit 111.

The purge gas outlet stream may contain a trace amount of hydrogen and/or hydrocarbon gases trapped in the void volumes of the adsorbent beds. In other words, some trapped hydrogen or hydrocarbon gas may not be removed into conduit 7 by the flush steps. Thus, it is preferred that conduit 9 provide the purge gas outlet stream to a burner 107. The stack 101 air exhaust stream is also provided through heat exchanger 127 into the burner 107. Any remaining hydrogen or hydrocarbon gas in the purge gas outlet stream is then burned in the burner to avoid polluting the environment. The heat from the burner 107 may be used to heat the reformer 123 or it may be provided to other parts of the system 100 or to a heat consuming devices outside the system 100, such as a building heating system.

Thus, with respect to the fuel exhaust stream, the heat exchanger 121 is located upstream of the heat exchanger 125, which is located upstream of the humidifier 119, which is located upstream of the condenser 113 and water separator 115, which is located upstream of the PPSA unit 1, which is located upstream of blower or compressor 109 which is located upstream of the fuel inlet conduit 111.

Figure 6:
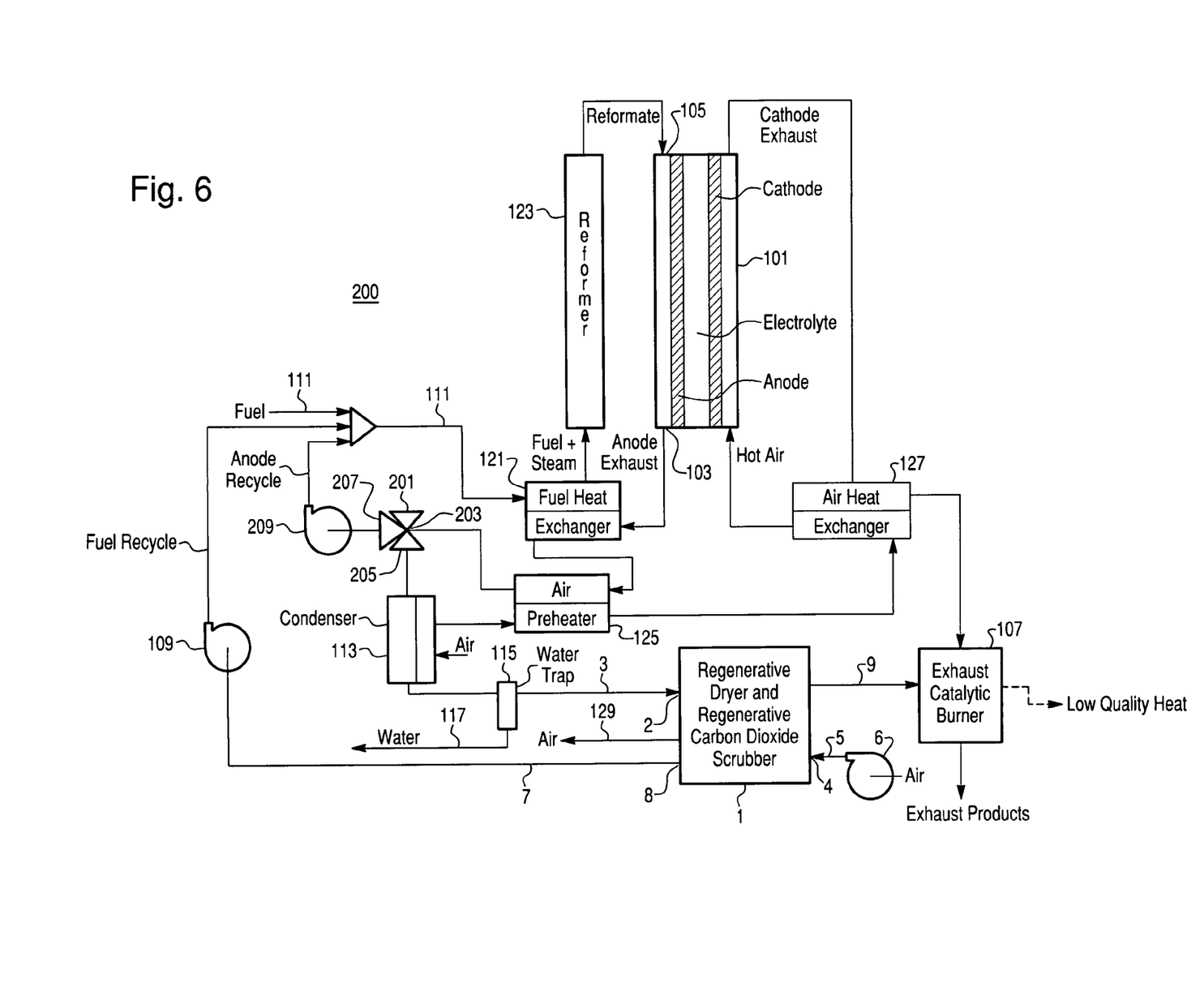

FIG. 6 illustrates a system 200 according to the sixth embodiment of the invention. The system 200 is similar to system 100 and contains a number of components in common. Those components which are common to both systems 100 and 200 are numbered with the same numbers in FIGS. 5 and 6 and will not be described further.

One difference between systems 100 and 200 is that system 200 preferably, but not necessarily lacks, the humidifier 119. Instead, a portion of the water vapor containing stack fuel exhaust stream is directly recycled into the stack fuel inlet stream. The water vapor in the fuel exhaust stream is sufficient to humidify the fuel inlet stream.

The system 200 contains a fuel splitter device 201, such as a computer or operator controlled multi-way valve, for example a three-way valve, or another fluid splitting device. The device 201 contains an inlet 203 operatively connected to the fuel cell stack fuel exhaust outlet 103, a first outlet 205 operatively connected to the condenser 113 and water separator 115 and a second outlet 207 operatively connected to the fuel cell stack fuel inlet 105. For example, the second outlet 207 may be operatively connected to the fuel inlet conduit 111, which is operatively connected to inlet 105. However, the second outlet 207 may provide a portion of the fuel exhaust stream into the fuel inlet stream further downstream.

Preferably, the system 200 contains a second blower or compressor 209 which provides the fuel exhaust stream into the fuel inlet stream. Specifically, the outlet 207 of the valve 201 is operatively connected to an inlet of a blower or compressor 209, while an outlet of the blower or compressor 209 is connected to the hydrocarbon fuel inlet conduit 111. In operation, the blower or compressor 209 controllably provides a desired amount of the fuel cell stack fuel exhaust stream into the fuel cell stack fuel inlet stream.

The method of operating the system 200 is similar to the method of operating the system 100. One difference is that the fuel exhaust stream is separated into at least two streams by the device 201. The first fuel exhaust stream is recycled into the fuel inlet stream, while the second stream is directed into the PPSA unit 1 where at least a portion of hydrogen and carbon monoxide contained in the second fuel exhaust stream is separated using the partial pressure swing adsorption. The hydrogen and carbon monoxide separated from the second fuel exhaust stream are then provided into the fuel inlet stream. For example, between 50 and 70%, such as about 60% of the fuel exhaust stream may be provided to the second blower or compressor 209, while the remainder may be provided toward the PPSA unit 1.

Preferably, the fuel exhaust stream is first provided through the heat exchangers 121 and 125 before being provided into the valve 201. The fuel exhaust stream is cooled to 200 degrees Celsius or less, such as to 90 to 180 degrees, in the heat exchanger 125 prior to being provided into the valve 201 where it is separated into two streams. This allows the use of a low temperature blower 209 to controllably recycle a desired amount of the first fuel exhaust stream into the fuel inlet stream, since such blower may be adapted to move a gas stream which has a temperature of 200 degrees Celsius or less.

The second blower or compressor 209 may be computer or operator controlled and may vary the amount of the fuel exhaust stream being provided into the fuel inlet stream depending on the conditions described above with respect to the fifth embodiment. Furthermore, the second blower or compressor may be operated in tandem with the first blower or compressor 109. Thus, the operator or computer may separately vary the amount of hydrogen and carbon monoxide being provided into the fuel inlet stream by the first blower or compressor 109 and the amount of fuel exhaust stream being provided into the fuel inlet stream by the second blower or compressor 209 based on any suitable criteria, such as the criteria described above with respect to the fifth embodiment. Furthermore, the computer or operator may take into account both the amount of hydrogen and carbon monoxide being provided into the fuel inlet stream by the first blower or compressor 109 and the amount of fuel exhaust stream being provided into the fuel inlet stream by the second blower or compressor 209 and optimize the amount of both based on the criteria described above.

In a seventh embodiment of the invention, a temperature swing adsorption ("TSA") unit is used to separate hydrogen from the fuel exhaust stream instead of the PPSA unit 1. A TSA unit also does not require the feed gas to be pressurized.

The TSA unit also contains a plurality of adsorbent beds of material which preferentially adsorbs carbon dioxide and water vapor to hydrogen and carbon monoxide. The fuel exhaust stream is provided to at least one first adsorbent bed which is maintained at room temperature or other low temperature to adsorb at large portion of carbon dioxide and water vapor from the fuel exhaust stream. When the first beds is saturated with carbon dioxide and water vapor, the fuel exhaust stream is switched to at least one second adsorbent bed. The first bed is then purged to release the adsorbed carbon dioxide and water vapor by increasing the temperature of the first bed. For example, the first bed may be heated by heat provided by the fuel cell stack, such as by providing the hot stack cathode air exhaust in heat exchange with the first bed. After purging, the first bed is then cooled with ambient air heat exchange. The cycle continues through the multiple beds to provide a constant recovery and circulation of the fuel. This embodiment is also amenable to the sequestration of carbon dioxide.

Rather than providing air in heat exchange with (i.e., adjacent to) the beds, the hot cathode exhaust may be directed through the adsorbent beds directly (with no separate heat exchanger) to discharge the carbon dioxide and water vapor. Then cool ambient air is passed directly through the beds to condition the beds for the next cycle. If desired, a small quantity of nitrogen may be is purged through the beds before and after the bed is reconditioned for additional carbon dioxide and water adsorption. The nitrogen is obtained from a small temperature swing adsorption device using air as the working fluid.

If desired, the TSA effluent, such as the carbon dioxide and water vapor containing effluent, may be discharged to ambient or removed via a vacuum pump after the purge gas is stopped. The vacuum removes more of the residual carbon dioxide and water (a process akin to pressure-swing adsorption, and commonly referred to as vacuum-swing adsorption) which might offer a less expensive and faster means to cool the bed than might be achieved using cool air or heat exchange. The use of the vacuum may also be amenable to the sequestration of carbon dioxide.

It is believed that by recycling at least a portion of the hydrogen from the fuel exhaust (i.e., tail) gas stream into the fuel inlet stream, a high efficiency operation of the fuel cell system is obtained. Furthermore, the overall fuel utilization is increased. The electrical efficiency (i.e., AC electrical efficiency) can range between about 50% and about 60%, such as between about 54% and about 60%, for the methods of the fifth and sixth embodiments when the per pass fuel utilization rate is about 75% (i.e., about 75% of the fuel is utilized during each pass through the stack). An effective fuel utilization of about 88% to about 95% is obtained when the per pass utilization is about 75%, and about 60% to about 85%, such as about 80% of the fuel exhaust gas hydrogen is recycled back to the fuel cell stack. Even higher efficiency may be obtained by increasing the per pass fuel utilization rate above 75%, such as about 76-80%, while rejecting up to about 95% of the carbon dioxide using adsorption. At steady-state, the methods of the fifth and sixth embodiments eliminate the need for generating steam when steam methane reformation is used to create the feed gas to the fuel cell. The fuel exhaust stream contains enough water vapor to humidify the fuel inlet stream to the stack at steam to carbon ratios of 2 to 2.5. The increase in net fuel utilization and the removal of heat requirement to generate steam increases the overall electrical efficiency. In contrast, without recycling hydrogen, the AC electrical efficiency is about 45% for a fuel utilization rate within the stack of about 75% to 80%.

The fuel cell systems described herein may have other embodiments and configurations, as desired. Other components may be added if desired, as described, for example, in U.S. application Ser. No. 10/300,021, filed on Nov. 20, 2002, in U.S. Provisional Application Ser. No. 60/461,190, filed on Apr. 9, 2003, and in U.S. application Ser. No. 10/446,704, filed on May 29, 2003 all incorporated herein by reference in their entirety. Furthermore, it should be understood that any system element or method step described in any embodiment and/or illustrated in any figure herein may also be used in systems and/or methods of other suitable embodiments described above, even if such use is not expressly described.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a fuel cell system, comprising:
  (1) providing a fuel inlet stream into a fuel cell stack;
  (2) operating the fuel cell stack to generate electricity and a hydrogen containing fuel exhaust stream;
  (3) separating at least a portion of hydrogen contained in the fuel exhaust stream, the step of separating comprising:
    (a) a first feed/purge step comprising:
      providing a feed gas inlet stream comprising at least a portion of the fuel exhaust stream into a first adsorbent bed;
      collecting a feed gas outlet stream comprising at least one separated component of the feed gas at a first output;
      providing a purge gas inlet stream into a second adsorbent bed; and
      collecting a purge gas outlet stream at a second output;
    (b) a first flush step, conducted after the first feed/purge step, the first flush step comprising:
      providing the purge gas inlet stream into the first adsorbent bed;
      collecting the purge gas outlet stream, which comprises at least one component of the feed gas that was trapped in a void volume of the first adsorbent bed, at the first output, wherein the first output is the same output as the first output in the first feed/purge step;
      providing the feed gas inlet stream into the second adsorbent bed; and
      collecting the feed gas outlet stream, which comprises a portion of the purge gas that was trapped in a void volume of the second bed, at the second output;
    (c) a second feed/purge step, conducted after the first flush step, the second feed/purge step comprising:
      providing the feed gas inlet stream into the second adsorbent bed;
      collecting the feed gas outlet stream comprising at least one separated component of the feed gas at the first output;
      providing the purge gas inlet stream into the first adsorbent bed; and
      collecting the purge gas outlet stream at the second output; and
    (d) a second flush step, conducted after the second feed/purge step, the second flush step comprising:
      providing the purge gas inlet stream into the second adsorbent bed;
      collecting the purge gas outlet stream, which comprises at least one component of the feed gas that was trapped in a void volume of the second adsorbent bed, at the first output;
      providing the feed gas inlet stream into the first adsorbent bed; and
      collecting a feed gas outlet stream, which comprises a portion of the purge gas that was trapped in a void volume of the first bed, at the second output; and
  (4) providing the hydrogen separated from the fuel exhaust stream into the fuel inlet stream.

2. The method of claim 1, wherein:
the fuel inlet stream comprises a hydrocarbon fuel inlet stream;
the fuel cell stack comprises a solid oxide fuel cell stack;
the fuel exhaust stream comprises unpressurized hydrogen, carbon monoxide, water vapor and carbon dioxide; and
the step of providing hydrogen comprises providing the hydrogen and carbon monoxide separated from the fuel exhaust stream into the hydrocarbon fuel inlet stream.

3. The method of claim 1, further comprising:
humidifying the fuel inlet stream using water vapor contained in the fuel exhaust stream;
after the step of humidifying, condensing and removing at least a part of the water vapor in the fuel exhaust stream; and performing the step of separating after the step of condensing and removing.

4. The method of claim 1, further comprising:
separating the fuel exhaust stream into at least two streams;
recycling a first fuel exhaust stream into the fuel inlet stream; and
separating at least a portion of hydrogen and carbon monoxide contained in a second fuel exhaust stream using the partial pressure swing adsorption, and providing the hydrogen and carbon monoxide separated from the second fuel exhaust stream into the fuel inlet stream.

5. The method of claim 4, further comprising:
cooling the fuel exhaust stream to 200 degrees Celsius or less prior to the step of separating the fuel exhaust stream into at least two streams;
using a first blower or compressor to controllably recycle a desired amount of the first fuel exhaust stream into the fuel inlet stream; and
using a second blower or compressor to controllably provide a desired amount of hydrogen and carbon monoxide separated from the second fuel exhaust stream into the fuel inlet stream.

6. The method of claim 1, further comprising:
cooling the fuel exhaust stream to 200 degrees Celsius or less; and
using a blower or compressor to controllably provide a desired amount of hydrogen and carbon monoxide separated from the cooled fuel exhaust stream into the fuel inlet stream.

7. The method of claim 1, wherein:
the first output comprises a gas stream containing the hydrogen separated from the fuel exhaust stream which is provided into the fuel inlet stream;
the second output comprises a gas stream containing carbon dioxide which is provided to a burner; and
a duration of the first and the second feed/purge steps is at least five times as long as a duration of the first and the second flush steps.

8. The method of claim 7, wherein:
the feed gas inlet stream is provided in each of the first and the second adsorbent beds in a first direction in steps (a), (b), (c) and (d);
in the first and the second feed/purge steps, the purge gas inlet stream is provided into each of the first and the second adsorbent beds in a different direction from the first direction; and
in the first and the second flush steps, the purge gas inlet stream is provided into each of the first and the second adsorbent beds in the first direction.

9. The method of claim 7, wherein:
the feed gas inlet stream comprises hydrogen, carbon monoxide, water vapor and carbon dioxide;
the purge gas inlet stream comprises air having a 50% or less relative humidity;
the at least one separated component which is collected at the first output comprises hydrogen and carbon monoxide;
at least a majority of the carbon dioxide and a portion of the water vapor in the feed gas inlet stream are adsorbed by the first and the second adsorbent beds during the first and the second feed/purge steps, respectively;
the adsorbed carbon dioxide and water vapor are removed from the first and the second adsorbent beds by the purge gas inlet stream, during the second and the first feed/purge steps, respectively;
the removed carbon dioxide and water vapor are collected with the purge gas outlet stream at the second output during the second and the first feed/purge steps; and
the adsorbent material of the first and the second adsorbent beds comprises activated carbon.

10. A fuel cell system, comprising:
a fuel cell stack;
a partial pressure swing adsorption unit comprising a first adsorbent bed and a second adsorbent bed;
a first conduit which operatively connects a fuel exhaust outlet of the fuel cell stack to a first inlet of the partial pressure swing adsorption unit;
a second conduit which operatively connects a purge gas source to a second inlet of the partial pressure swing adsorption unit;
a third conduit which operatively connects an outlet of the partial pressure swing adsorption unit to a fuel inlet of the fuel cell stack; and
in operation, the first adsorbent bed performs the following functions:
(a) receives the feed gas inlet stream comprising at least a portion of the fuel cell stack fuel exhaust stream from the first conduit and provides at least one separated component of the feed gas to the third conduit in a first feed/purge step;
(b) receives the purge gas inlet stream from the second conduit and provides a purge gas outlet stream, which comprises at least one component of the feed gas that was trapped in a void volume of the first bed to the third conduit in a first flush step, conducted after the first feed/purge step, wherein the third conduit is the same conduit as the third conduit in the first feed/purge step;
(c) receives a purge gas inlet stream from the second conduit and provides a purge gas outlet stream to an output different from the third conduit in a second feed/purge step, conducted after the first flush step; and
(d) receives the feed gas inlet stream from the first conduit and provides a feed gas outlet stream, which comprises a portion of the purge gas that was trapped in a void volume of the first bed, to at an output different from the third conduit in a second flush step, conducted after the second feed/purge step; and
in operation, the second bed performs the following functions:
(a) receives a purge gas inlet stream from the second conduit and provides a purge gas outlet stream to at an output different from the third conduit in a first feed/purge step;
(b) receives the feed gas inlet stream from the first conduit and provides the feed gas outlet stream, which comprises a portion of the purge gas that was trapped in a void volume of the second bed, to an output different from the third conduit in a first flush step, conducted after the first feed/purge step;
(c) receives the feed gas inlet stream from the first conduit and provides the feed gas outlet stream comprising at least one separated component of the feed gas to the third conduit in a second feed/purge step, conducted after the first flush step; and
(d) receives the purge gas inlet stream from the second conduit and provides the purge gas outlet stream, which comprises at least one component of the feed gas that was trapped in a void volume of the second bed to the third conduit in a second flush step, conducted after the second feed/purge step.

11. The system of claim 10, wherein:

the fuel cell stack comprises a solid oxide fuel cell stack;

the first and second adsorbent beds comprise a material which preferentially adsorbs carbon dioxide to hydrogen and carbon monoxide; and the system lacks a compressor which in operation compresses the fuel cell stack fuel exhaust stream to be provided into the partial pressure swing adsorption unit.

12. The system of claim 10, further comprising a blower or compressor having an inlet which is operatively connected to the partial pressure swing adsorption unit and an outlet which is operatively connected to a fuel inlet of the fuel cell stack, wherein in operation, the blower or compressor controllably provides a desired amount of hydrogen and carbon monoxide separated from a fuel cell stack fuel exhaust stream into the fuel cell stack fuel inlet stream.

13. The system of claim 10, further comprising a condenser and water separator having an inlet which is operatively connected to the fuel cell stack fuel exhaust outlet and an outlet which is operatively connected to an inlet of the partial pressure swing adsorption unit.

14. The system of claim 13, further comprising a fuel humidifier having a first inlet operatively connected to a hydrocarbon fuel inlet conduit, a second inlet operatively connected to the fuel cell stack fuel exhaust outlet, a first outlet operatively connected to the fuel cell stack fuel inlet, and a second outlet operatively connected to the condenser and water separator, wherein in operation, the fuel humidifier humidifies a fuel inlet stream using water vapor contained in a fuel cell stack fuel exhaust stream.

15. The system of claim 10, further comprising a fuel splitter having an inlet operatively connected to the fuel cell stack fuel exhaust outlet, a first outlet operatively connected to the condenser and water separator, and a second outlet operatively connected to the fuel cell stack fuel inlet.

16. The system of claim 15, wherein:

the fuel splitter comprises a multi-way valve;

the first outlet of the multi-way valve is operatively connected to an inlet of a blower or compressor;

an outlet of the blower or compressor is connected to a fuel cell stack hydrocarbon fuel inlet conduit; and in operation the blower or compressor controllably provides a desired amount of the fuel cell stack fuel exhaust stream into the fuel cell stack fuel inlet stream.

17. A fuel cell system, comprising:

a fuel cell stack;

a separation means for separating at least a portion of hydrogen contained in a fuel cell stack fuel exhaust stream using partial pressure swing adsorption and for providing the hydrogen separated from the fuel exhaust stream into a fuel cell stack fuel inlet stream;

a first means for providing a feed gas inlet stream comprising at least a portion of the fuel cell stack fuel exhaust stream;

a second means for providing a purge gas inlet stream;

a third means for collecting at least one separated component of the feed gas;

a fourth means for:
  (a) receiving the feed gas inlet stream from the first means and for providing at least one separated component of the feed gas to the third means in a first feed/purge step;
  (b) receiving the purge gas inlet stream from the second means and for providing a purge gas outlet stream, which comprises at least one component of the feed gas that was trapped in a void volume of the fourth means to the third means in a first flush step, conducted after the first feed/purge step, wherein the third means is the same means as the third means in the first feed/purge step;
  (c) receiving a purge gas inlet stream from the second means and for providing a purge gas outlet stream to an output different from the third means in a second feed/purge step, conducted after the first flush step; and
  (d) receiving the feed gas inlet stream from the first means and for providing a feed gas outlet stream, which comprises a portion of the purge gas that was trapped in a void volume of the fourth means, to at an output different from the third means, in a second flush step, conducted after the second feed/purge step; and a fifth means for:
  (a) receiving a purge gas inlet stream from the second means and for providing a purge gas outlet stream to at an output different from the third means in a first feed/purge step;
  (b) receiving the feed gas inlet stream from the first means and for providing the feed gas outlet stream, which comprises a portion of the purge gas that was trapped in a void volume of the fifth means, to an output different from the third means in a first flush step, conducted after the first feed/purge step;
  (c) receiving the feed gas inlet stream from the first means and for providing the feed gas outlet stream comprising at least one separated component of the feed gas to the third means in a second feed/purge step, conducted after the first flush step; and
  (d) receiving the purge gas inlet stream from the second means and for providing the purge gas outlet stream, which comprises at least one component of the feed gas that was trapped in a void volume of the fifth means to the third means in a second flush step, conducted after the second feed/purge step.

18. The system of claim 17, wherein:

the fuel inlet stream comprises a hydrocarbon fuel inlet stream;

the fuel cell stack comprises a solid oxide fuel cell stack;

the fuel exhaust stream comprises hydrogen, carbon monoxide, water vapor and carbon dioxide;

the separation means is a means for adsorbing at least a majority of the carbon dioxide and a portion of the water vapor in the fuel exhaust stream while allowing at least a majority of the hydrogen and carbon monoxide in the fuel exhaust stream to be passed through into the hydrocarbon fuel inlet stream.

* * * * *